Figure 1:
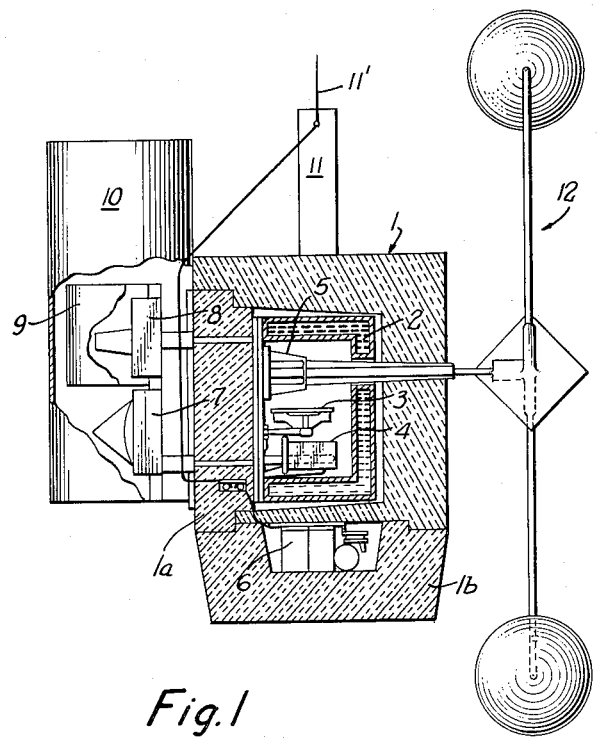

April 3, 1962        V. ROSSI        3,028,486
RADIOSONDE AND TEMPERATURE CONTROLLING MEANS THEREFOR
Filed Aug. 17, 1959

INVENTOR
Veikko Rossi

BY

ATTORNEY 3,028,486
RADIOSONDE AND TEMPERATURE CON-
TROLLING MEANS THEREFOR
Veikko Rossi, Ilmala, Pasila, Finland
Filed Aug. 17, 1959, Ser. No. 834,074
2 Claims. (Cl. 250—2)

This invention relates to radiosondes and more specifically to a novel and improved radiosonde housing and arrangement of elements that will afford more dependable operation of the electronic circuitry and measuring devices for atmospheric conditions resulting in greatly improved accuracy and dependability of the measurements made by the apparatus.

A radiosonde is a device usually embodying a radio transmitter and a plurality of measuring devices each responsive to a specific condition of the atmosphere and interconnected with a transmitter for transmitting information to a ground or other station. The radiosonde is either sent aloft by a ballon or dropped by parachute from high altitude aircraft in order to determine the characteristics of the atmosphere at various elevations. In the normal operation of radiosondes temperature differences of the order of plus 40° C. to −80° C. are frequently encountered and in some instances the radiosonde may be subjected to even greater variations. These large temperature variations adversely affect the transmitter and certain other measuring instruments such as the aneroid barometer and the effect on the transmitter is particularly noticeable when the transmitter is responsive to frequency changes produced by the measuring equipment. At the present time the frequency modulated transmitters generally operate at a frequency of about 23 to 26 megacycles and it is anticipated that even higher frequencies will be allocated to radiosondes and such higher frequencies will further aggravate existing difficulties encountered in obtaining accurate results.

This invention contemplates the provision of an improved radiosonde housing and coordination of elements that will overcome the difficulties presently encountered with radiosondes and provide an instrument that will afford a considerably higher degree of accuracy and dependability than that heretofore attained.

Another object of the invention resides in the provision of an improved radiosonde that will record changes in barometric pressure, temperature and humidity, and wherein a transmitter and barometer are coordinated with the housing to produce dependable and accurate indications throughout the measuring operation.

The above and other objects of the invention will become more apparent from the following description and accompanying drawings forming part of this application.

Figure 2:
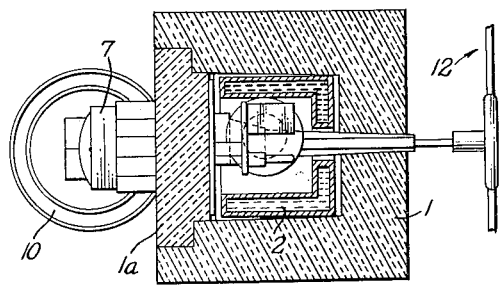

In the drawings:

FIGURE 1 is a side elevational view of the radiosonde in accordance with the invention and with side portions of the housing broken away to show the arrangement and coordination of the elements; and FIGURE 2 is a bottom view of the embodiment of the invention shown in FIGURE 1 with the bottom portions of the housing, including the battery compartment, broken away.

As pointed out above, radiosondes have presented considerable difficulty in attaining the desired and necessary accuracy in the measurement of atmospheric conditions and known procedures for overcoming these difficulties have not been found satisfactory. With the radiosonde in accordance with the invention, however, and particularly radiosondes embodying frequency modulated transmitters, high degrees of stability and accuracy can be attained.

Referring to the drawings, the sonde includes a substantially rectangular hollow housing generally denoted by the numeral 1 and having a removable closure 1a and a hollow battery containing portion 1b removably secured to the main housing part. The housing 1, including the portions 1a and 1b, is preferably made of a suitable insulating material such as polystyrene or other heat insulating material and the thickness of the housing is preferably made large in comparison to the central opening therein.

The closure portion 1a of the housing 1 carries a radio transmitter 4, a barometer 3 and a windmill switch mechanism 5 having an outwardly extending shaft that protrudes beyond the outer surface of the housing 1 and carries a mechanism 12 which rotates the switch shaft in response to air speed. The housing portion 1b holds the batteries 6 for operation of the transmitter which is preferably frequency modulated and is adapted to transmit information sought to be recorded.

A second housing portion, the housing closure 1a carries a hygrometer 7 and a thermometer 8, the latter being disposed within a small shield 9, and both measuring devices are placed within a double open-ended cylindrical shield 10. The shield 10 protects the thermometer 8 against the warming effect of the sun's radiation and thus causes the thermometer to respond solely to air temperature. The thermometer 8, hygrometer 7 and the barometer 3 are connected by means of switch 5 to the transmitter and function to frequency modulate it for the purpose of transmitting information by these instruments to a ground or other receiving station.

In order to attain a high degree of accuracy and stability in the operation of the radiosonde, the transmitter is preferably provided with ceramic capacitors in the frequency determining circuits to minimize frequency changes with temperature. While the transmitter, together with the barometer 3 and switch 5 are disposed within the housing 1, as illustrated, to reduce the effect of wide variations in temperature on the operation of these elements, such reduction is insufficient to attain the desired accuracy and dependability of the measurements.

It has been found that an exceedingly high degree of temperature stabilization can be afforded the elements within the housing 1 by maintaining the temperature at a substantially constant value throughout the ascent or descent of the radiosonde as the case may be. Particularly effective results are attained by at least partially surrounding the barometer 3, transmitter 4 and switch 5 with a hollow, five-sided, rectangular container 2 that includes a mixture of water and ice. In so doing, the ice and water mixture will produce a temperature of zero degrees centigrade within the housing and such temperature can be maintained through the utilization of the thick-walled insulating outer housing 1 for substantial periods of time. In this way, the barometer 3, transmitter 4 and switch 5 will be maintained at a constant temperature, and since the barometric pressure is independent of temperature, the pressure recorded by the barometer 3 within the housing and at a constant temperature of zero degrees centigrade, will correspond exactly with the barometric pressure surrounding the radiosonde. While it is desirable to utilize a mixture of water and ice to create the desired operating temperature within the radiosonde, it is evident that a mixture of liquid and frozen forms of other similar materials may be utilized in the same way for attaining a desired constant temperature.

With reference to the windmill the switch 5 can be relied upon to operate uniformly and permit free rotation of the windmill 12.

Actual tests with the apparatus as described above have shown that prior difficulties in barometric calibration are overcome and the barometer need be calibrated at only one temperature, namely, zero degrees centigrade, in the illustrated embodiment of the invention. Heretofore the barometer had to be calibrated at two different temperatures as for instance +20 and −60 degrees centigrade and even then it was exceedingly difficult to obtain accurate indications of barometric pressure, since the nature of the variations in the operation of a barometer at different temperatures is not precisely known. With this invention such unknown factors do not affect the results, since the barometer is functioning at all times at a single, precise temperature and once it is calibrated at the selected temperature, the actual readings of the barometer can be quickly interpreted to obtain the true barometric pressure.

The transmitter 4 may take any desired form and since transmitters including frequency modulated transmitters are well known in the art, detailed circuit illustrations were not deemed necessary. Similarly, the barometer 3, switch 5 and the other measuring devices may be of conventional construction.

The measuring devices 3, 7 and 8 are preferably in the form of transducers which convert changes in atmospheric conditions to an electric characteristic and are interconnected with the transmitter 4 to modify the signal emitted by the transmitter in accordance with the detected variations in atmospheric conditions. The antenna, coupled with the transmitter 4, may take any desired configuration and in the present form constitutes a conductive element leading from the transmitter outwardly of the housing and connected to the upper end of the sling 11, which provides means for attachment of the radiosonde to a balloon, parachute or other equivalent transporting device. In certain cases it may be desired to utilize as an antenna the supporting wires for attachment of the radiosonde to the transporting means and in the illustrated embodiment of the invention a short, upwardly extending wire portion 11' is illustrated and constitutes a fragmentary portion of the radiosonde support which also forms part of the radiosonde antenna.

While only one embodiment of the invention has been illustrated and described, it is apparent that other modifications and changes may be made without departing from the true scope and spirit thereof.

What is claimed is:

1. A radiosonde comprising a hollow housing, a transmitter and barometer within said housing, a waterproof liner overlying the internal walls of said housing, a second waterproof liner of smaller dimensions than the first said liner and disposed within the first said liner to form a space therebetween, a mixture of water and ice filling the space between said liners and means sealing said liners one to the other to retain the water and ice therebetween, said water and ice mixture controlling the temperature of said transmitter and barometer during the operation of the radiosonde.

2. A radiosonde comprising a relatively thick-walled hollow housing of heat insulating material and having at least one open side, a cover of insulating material for closing said open side, a radio transmitter, barometer and switch carried by said cover, a windmill shaft extending from said switch, a hollow walled heat controlling shield carried by said base and at least partially enclosing said transmitter, barometer and switch with said shaft extending through said shield and said housing, said shield being filled with a mixture of ice and water, wind responsive means carried by the outer end of said shaft, a battery and housing therefor secured to the first said housing and electrically connected with said transmitter, a double open ended tube secured to the outside of the first said housing and closure therefor and including a thermometer and hygrometer, connections between said switch, barometer, hygrometer and thermometer and said transmitter, and an antenna connected to said transmitter and extending from the first said housing.

References Cited in the file of this patent

UNITED STATES PATENTS

| | | |
|---|---|---|
| 1,904,771 | Hentschel | Apr. 18, 1933 |
| 1,962,210 | Osnos | June 12, 1934 |
| 2,286,621 | Hurley | June 16, 1942 |
| 2,462,102 | Istvan | Feb. 22, 1942 |
| 2,604,582 | Hauck et al. | July 22, 1952 |